March 7, 1933.  R. J. NORTON  1,900,844

BRAKE DRUM

Filed Sept. 20, 1930

Inventor
Raymond J. Norton
By Semmes & Semmes
and M. W. McConkey
Attorney

Patented Mar. 7, 1933

1,900,844

UNITED STATES PATENT OFFICE

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS

BRAKE DRUM

Application filed September 20, 1930. Serial No. 483,356.

This invention relates to brake mechanism and more particularly to an improved brake drum. The brake drum now generally employed in the automotive field is a relatively easily deformable low carbon steel which is stamped into shape. At its open face the drum is provided with an integral circumferential flange which serves in part to rigidify the drum and to increase the dissipation of generated frictional heats.

In order effectively to subserve its function the brake drum should be a member which is of sufficient rigidity to withstand braking stresses; of sufficient hardness to minimize abrasive wear to the greatest possible degree; of such thermal properties as to rapidly conduct heat away from the frictional surfaces and to dissipate this transmitted heat at the highest possible rate.

An object of the present invention is to provide a brake drum in which the aforementioned functions are effectively achieved.

Another object of the invention is to provide a brake drum characterized by a high degree of hardness on the frictional engaging surfaces and high heat conductivity from such surfaces to the heat radiating surfaces.

Yet another object is to provide a brake drum of pressed metal having a hardened frictional surface and possessed of sufficient rigidity to prevent distortion.

A further object is to provide a brake drum characterized by a high degree of wear resistance at the frictional braking surfaces, a high degree of rigidity and a high degree of heat conductivity and emissivity.

With these and other equally important objects in view the invention comprises the provision of a brake drum which is initially formed up from a relatively readily deformable metal, such as low carbon steel, and which is treated, at the friction surface, to increase the hardness and wear resistance and at the exterior surface to effectively conduct away generated heats and dissipate these rapidly from exposed radiating areas.

Figure 1:
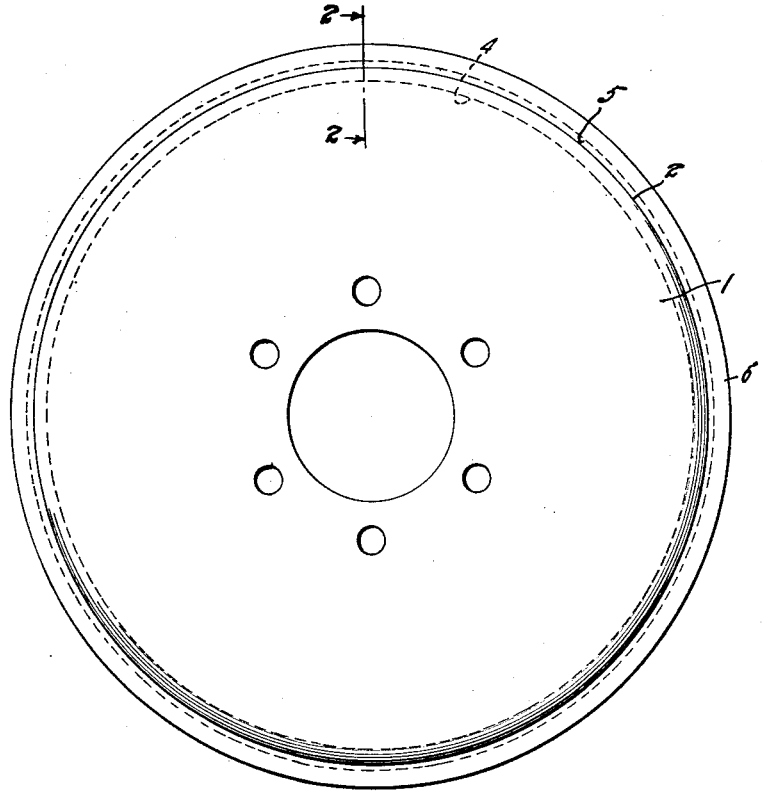
Figure 2:
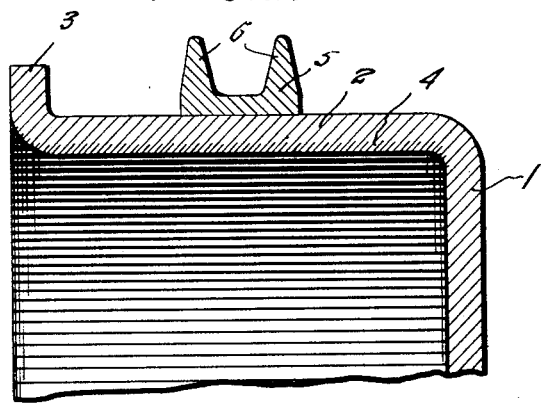

In order to enable a more ready comprehension of the invention a typical embodiment is shown in the accompanying drawing in which Figure 1 is an elevation of the drum, and
Figure 2 is an enlarged cross sectional detail taken on line 2—2 of Figure 1.

In accordance with the principles of the present invention a brake drum may be formed up, in the usual manner, from a blank of deep draw steel so as to present a member having a head 1, an integral circumferential braking flange 2 and an upstanding (or depending) marginal lip 3. This marginal lip, as noted previously, serves a double function; it rigidifies the drum and thereby tends to prevent general distortion and bell-mouthed expansion and in addition serves as a heat dissipating fin.

After the drum has been formed up in the desired shape, or if desired before such forming operation, that portion of the metal of the drum which constitutes the wearing surface is treated to increase its hardness or wear resistance. This may be done, for example, by case carburizing this surface. This treatment, which may be carried out by methods well known to those skilled in the art, results in the formation of a zone or skin of metal, indicated at 4, which is characterized by a higher degree of hardness than the remainder of the drum. This at once insures longevity of the drum.

After the forming operation there is associated with the drum a member which at the one time rigidifies the drum and presents a highly conductive path for transmitting generated frictional heats. This may be done by providing an annulus 5 of a metal which has a higher thermal conductivity than the metal of the drum and preferably having a coefficient of expansion as closely as possible approximating that of the drum. This annulus, as shown in Figure 2, may be mounted at about the central portion of the drum but if desired may be provided at any other section. The member is preferably formed with protuberances such as the heat radiating fins 6, to increase the exposed surface area and accelerate the dissipation of heat. Since this annulus has a large surface area with respect to its total volume the cooling effect will be considerable.

A metal which at one time presents a high heat conductivity and a relatively low coefficient of expansion is a recently developed alloy known in the industry as alloy No. 132. This is an aluminum base alloy containing about 14% of silicon and varying small amounts of magnesium, copper, and nickel. This material is characterized by the very high conductivity of aluminum and aluminum alloys but differs from these in possessing a relatively low coefficient of expansion and in this factor closely approximates the expansion of nonmagnetic steels and irons. This member may be cast or otherwise formed around the exterior surface of the drum. It may be maintained in position with respect to the drum by compression or it may be suitably secured to the drum.

It will be seen that the drum thus provided presents a braking flange of high wear resistance and high resistance to distortion. Furthermore, by utilizing a material of the character specified a highly conductive path is provided for the generated heats of friction. By forming the rigidifying annulus with heat radiating fins additional heat dissipation is insured. If desired, the exterior heat dissipating surfaces may be so treated as to further increase the heat emissivity. This may be done for example by coating the surface with materials which increase the heat emissivity or by, so to speak, forming this material on such surfaces in situ. This latter may be done by subjecting the radiating surface of the annulus to anodic oxidation so as to ultimately form thereon the ighly heat emissive aluminum oxide.

It will now be appreciated that the drum herein described presents many advantages. It permits the employment of the relatively inexpensive low carbon steel with all of the facility of manufacture of this material while insuring a drum which is sufficiently rigid and strong to resist the highest braking stresses and one which presents an optimum resistance to wear. The structure is additionally improved by providing for the rapid conduction and dissipation of the generated frictional heats.

While a preferred embodiment of the invention is herein described it is to be understood that this is given merely as a typical example of the effectuation of the underlying principles involved; and since these principles may be incorporated in other physical structures it is not intended to be limited to that described herein, except as such limitations are unequivocally imposed by the appended claims.

I claim:

1. A brake drum of low carbon steel having a frictional engaging surface of a higher carbon content, and an exterior rigidifying annulus.

2. A brake drum of low carbon steel having a frictional engaging surface of a higher carbon content, and an exterior non-ferrous rigidifying member.

3. A brake drum composed largely of steel having an exterior metallic annulus having a greater heat conductivity and emissivity than iron and having a frictional engaging surface of greater wear resistance than the body of the drum.

4. A brake drum of low carbon steel, having a frictional engaging surface of a higher carbon content and an exterior rigidifying annular member of material having a greater thermal conductivity and emissivity than iron.

5. A brake drum of low carbon steel, having a frictional engaging surface of a higher carbon content, and an exterior rigidifying annular member of material having a greater thermal conductivity than iron and substantially the same coefficient of expansion as iron.

6. A cooling annulus for a low carbon steel brake drum composed of an aluminous alloy having a greater thermal conductivity than iron and substantially the same coefficient of expansion as iron, the exterior surface of which is coated with aluminum oxide.

In testimony whereof I affix my signature.

RAYMOND J. NORTON.